Jan. 22, 1952     U. CORBINO     2,583,167
NONSYMMETRICAL MULTIPOLAR ELECTRIC
ENERGY DISTRIBUTION SYSTEM
Filed Sept. 30, 1948     2 SHEETS—SHEET 1
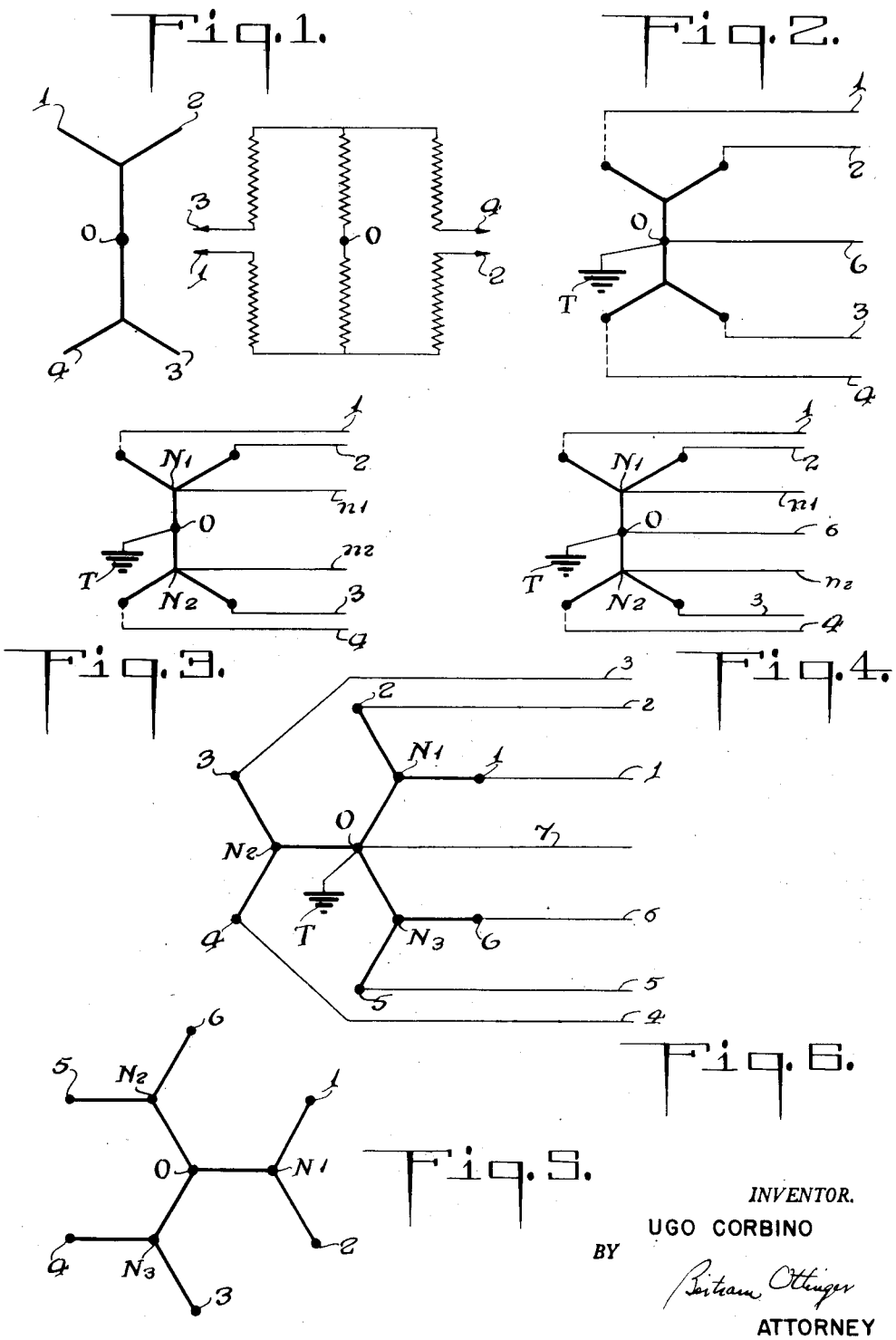
INVENTOR.
UGO CORBINO
BY
ATTORNEY Jan. 22, 1952 U. CORBINO 2,583,167
NONSYMMETRICAL MULTIPOLAR ELECTRIC
ENERGY DISTRIBUTION SYSTEM
Filed Sept. 30, 1948 2 SHEETS—SHEET 2
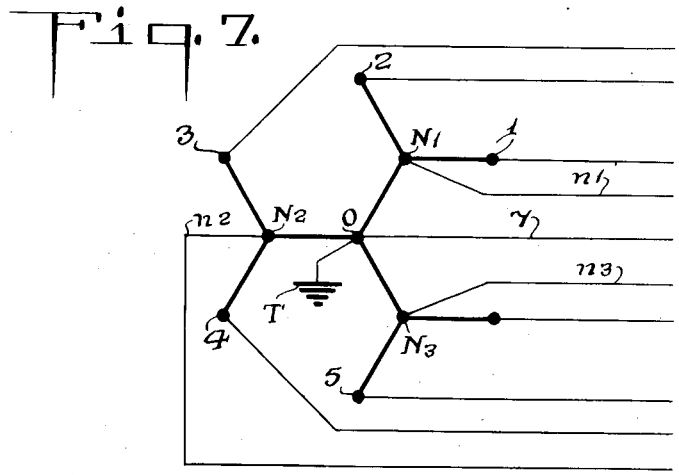
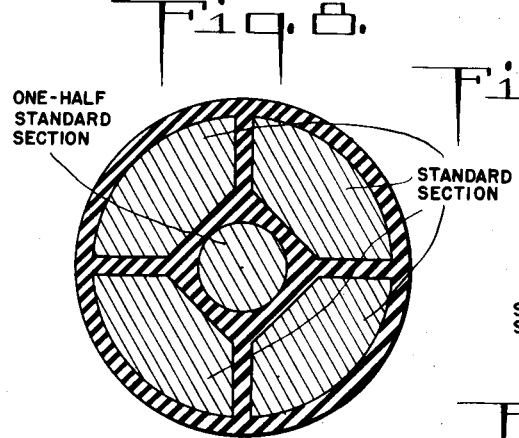
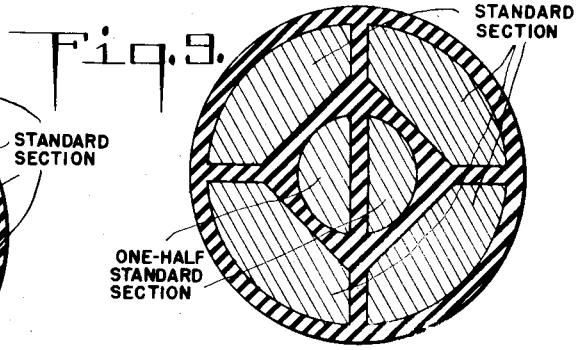
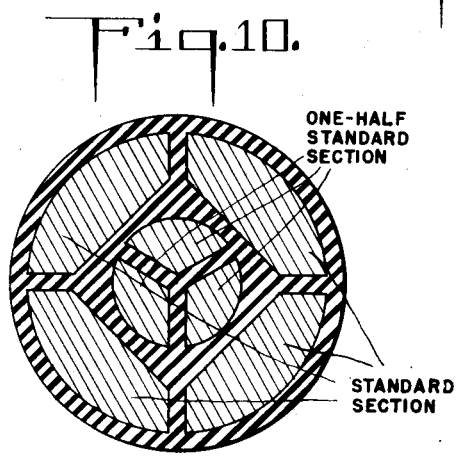
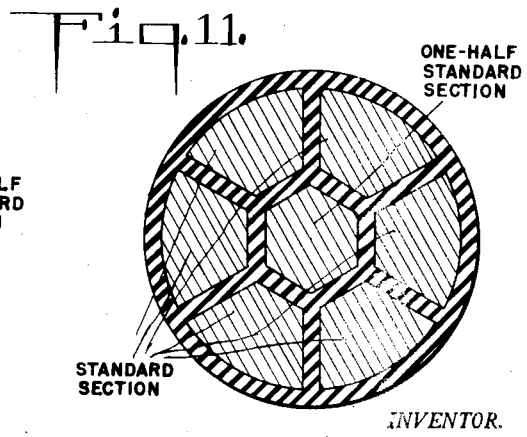
INVENTOR.
UGO CORBINO
BY
ATTORNEY Patented Jan. 22, 1952

2,583,167

UNITED STATES PATENT OFFICE 2,583,167

NONSYMMETRICAL MULTIPOLAR ELECTRIC ENERGY DISTRIBUTION SYSTEM

Ugo Corbino, Rome, Italy

Application September 30, 1948, Serial No. 52,048
In Italy October 3, 1947

12 Claims. (Cl. 171—97)

1:—Nonsymmetrical grouping of the phases of a three-phase generator or transformer The usual three-phase winding of a generator, and one of the windings (primary or secondary) of a transformer, can be connected and grouped in such a way as to present multiple polarities and neutral points thus forming non-symmetrical polyphase systems.

From such non-symmetrical polyphase systems it is possible to derive non-symmetrical multipolar distribution systems which when the principal neutral point forming the center of the system is grounded are characterized by a maximum tension towards earth equal to the tension of a normal three-phase system with insulated neutral. The distribution effected with such non-symmetrical polyphase systems, although enabling the normal standard single-phase or three-phase distribution tensions to be maintained, allows transportation at higher tensions and therefore permits great economy in the total section of the conductors and in the losses.

The systems taken into consideration with this object in view are: the non-symmetrical four-phase and the six-phase: in the indicative diagrams which follow, as shown in Figs. 1 to 7, inclusive, of the drawing, the vector method will be used to represent them, since it is thus easy in each diagram to reconstruct the related grouping of the phases in the three-phase feeder circuit. Figs. 8 to 11, inclusive, illustrate cable sections used in these systems.

In Fig. 1 of the annexed drawing, in order to give a clearer idea of one of the more typical cases, comparison is made between the vector diagram on the one hand, to the left, and on the other hand, to the right, the corresponding grouping of phases in a normal three-phase circuit, which could be any primary, secondary or tertiary of a transformer, or the stator winding of a synchronous three-phase generator (alternator).

From the correspondence between the two circuits, in which the four poles and their related conductors are indicated with the same numbers, from 1 to 4, it will be easy in the other "vector" diagrams which will be given alone hereafter, to deduce the corresponding circuits and the relative "groupings."

2:—Four-phase non-symmetrical double star grouping

It must be recalled, first of all, that safety to persons limits the normal low-voltage distribution tensions to values generally around 220./.260 volts three-phase, to which the co-relative 125./.150 volts between phase and neutral correspond, in single-phase utilizations.

Now, supposing we group the phases on the low-tension side of the distribution transformer which is feeding a low-tension network, according to the non-symmetrical double star four-phase circuit (shown in Fig. 2), and we connect the central point $0$ of the system permanently with the ground, we obtain what could be called a double "plus and minus" three-phase circuit, similar to what we obtain with direct-current when the central point of the generator is grounded and a tension "+0—" is distributed in relation to the central zero point. Here too, in the case under consideration, conductor $6$ which starts from the central point $0$, earthed, can be a reduced section since it must only carry "difference" currents and, in the case of balanced loads, no current at all.

On the other hand, as far as tension towards ground is concerned, and therefore danger for persons, this tension is limited to the concatenated tension of the elementary star which, doubled, forms the four-phase circuit: thus, for example, if the elementary star gives a concatenated tension of 220 volts, although there is 440 volts between the "diagonal" phases, of the four-phase circuit, the maximum tension towards ground is limited to 220 volts.

From the above, we have a low tension distribution system which, according to the conventional language used in describing cables insulated to 1000 volts, would be described by calling it a 4 and ½ by S, where S is the section in square millimeters of the phase conductor. The cable, in other words, consists of five conductors, 4 of which are of the indicated section, plus a fifth of half that section.

With a 4 and ½ cable, fed with four phases, we can feed two three-phase utilizing systems which would normally require two three-phase cables, in other words six conductors.

Another distribution diagram obtainable with four-phase feed is that indicated in Fig. 3, in which, instead of having conductor 6 leaving the central point $0$, we have two conductors $n_1$ and $n_2$ leaving the two neutral points $N_1$ and $N_2$ of the two stars. This diagram can be described with the conventional denomination: 4 by S—2 by 0.5S, the value 0.5S being the value corresponding to the two conductors $n_1$, $n_2$ leaving the two neutral points of the connected stars. In other words, four cables are of the same standard section and each of two cables have one-half that section.

On the hypothesis that we still have a 220 volt concatenated tension of the elementary star, this diagram gives us:

(a) 4 feeds at 127 volts, single-phase
(b) 1 feed at 250 volts, single-phase
(c) 1 feed at 440 volts, four-phase, from which we can feed three-phase motors or other utilizers wound for 440 volts with the required four-phase grouping of the windings concerned. The four single-phase feeds (a) are between the couples (Fig. 3) 1—$n_1$, 2—$n_1$, 3—$n_2$, and 4—$n_2$. The one single-phase feed (b) is between $n_1$ and $n_2$. The one four-phase feed (c) is between 1—2—3—4.

Finally, in Fig. 4, we have the distribution diagram of the type 4 by S+3 by 0.5S which corresponds to a fusion of the two previous diagrams and includes seven conductors in all, those of the two couples 1,2 and 3,4 common to the other two diagrams, those of the couple $n_1$, $n_2$ which this diagram has in common with the diagram of Fig. 2, and finally conductor 6, leaving the central point 0 like the corresponding conductor in Fig. 1. This third diagram gives us:

(a) 6 circuits at 127 volts, single-phase,
(b) 1 circuit at 250 volts, single-phase,
(c) 2 circuits at 220 volts, three-phase,
(d) 1 circuit at 440 volts, four-phase, in all three low-tension feeder diagrams, since the center 0 is grounded, the maximum tension towards earth of any conductor cannot exceed 220 volts. The six single-phase feeds (a) are between the couples (Fig. 4) 1—$n_1$, 2—$n_1$, 6—$n_1$, 6—$n_2$, 3—$n_2$ and 4—$n_2$. The one single-phase feed (b) is between $n_1$ and $n_2$. The two three-phase feeds (c) are 1—2—6 and 3—4—6. The one four-phase feed (d) is 1—2—3—4.

3.—Non-symmetrical six-phase grouping

The idea which suggested the above grouping of two three-phases systems, utilizable in power distribution, can be further extended to the grouping of three three-phase systems connected to the low-tension side of three-phase transformers, so as to form non-symmetrical six-phase groupings.

The diagram of Fig. 5 gives a six-phase grouping obtained by combining three normal three-phase circuits, which has already been used in mercury vapour current rectifiers.

This star grouping is an "open" grouping which presents the external polarities 1, 2, 3, 4, 5, 6 arranged according to a normal six-phase circuit, but offering in addition the possibility of obtaining conductors from the three "neutral" points $N_1$, $N_2$, $N_3$ of the three component stars in addition to the center or fundamental neutral of the system 0, making this system applicable to the object of the present invention.

Some of the methods of utilizing these groupings when used in distribution systems are shown in Figs. 6 and 7, Fig. 6 indicating a distribution diagram which can be derived from the low-tension side of a network transformer grouped in "triple star" and with the center 0 of the system in communication with the earth T and each of the three component elementary stars having the normal distribution tension concatenated (for example, 220 volts).

It is therefore clear that with such an arrangement, while as far as danger to persons is concerned the maximum tension stays at 220 volts, the distribution system indicated allows of combinations giving economy in conductors and reduction in losses.

In addition, while a non-symmetrical "double star" four-phase system gives as a new tension (440 volts), in the "four-phase" grouping of the three-phase utilizing circuits, the "triple star" system offers us two three-phase 380 volt circuits which can be derived respectively from the odd and even phases.

Thus the systems in Figs. 6 and 7, in the first of which we have, in addition to the six conductors 1, 2, 3, 4, 5, 6, another conductor 7 which leaves the central point 0, and in the second of which we have, in addition to the above 7 conductors, three other conductors $n_1$, $n_2$, $n_3$ leaving the neutral points $N_1$, $N_2$, $N_3$ of the three elementary stars, make it possible to obtain the following circuits:

(a) a "triple star" system with 6 and ½ conductors (Fig. 6): three 220 volt three-phase circuits; two 380 volt three-phase circuits.

(b) a "triple star" system with 6+4 and ½ conductors which, in addition to all the circuits given above, also permits obtaining a fourth 220 volt three-phase circuit between the neutral points $N_1$, $N_2$, $N_3$; as well as nine 127 volt single-phase circuits.

4.—Multipolar sectoral concentric cables

When the multiple groupings of the types described above, double star or triple star, are used in transmission or distribution systems by cable, a certain difficulty in the construction of said cables is met, due to the fact that, although there is a decided decrease in the total section of the conductor, under equal conditions of transmitted power, and therefore a corresponding decrease in losses, there is, on the other hand, a complication in manufacturing these cables due to the increased number of conductors.

Since it is not possible to subdivide the usual "sector" cables into such a larger number of conductors, a new type of multipolar "sector-concentric" cable has been devised in order to satisfy the requirements of the multipolar systems described, and in which the central part of the cable itself constitutes a sector section to handle, for example, the "neutral" conductors having a smaller section (for example ½), while the circular outer area is divided into a number of sector conductors corresponding, for example, to the whole phases of the system.

In Figs. 8 to 10 there are indicated cable sections of types 4 and ½, 4+two halves, 4 plus three halves in concentric sectors.

In Fig. 11 the section of a cable of type 6 and ½ is shown, in which, however, the central conductor area, instead of being circular, is a regular polygon having the same number of sides as the number of whole phase conductors distributed around the circular outer area.

It is understood that if the neutral conductors should be more than one, this central polygon, like the circle in Fig. 8, could be divided by a corresponding number of radial diaphragms into the corresponding number of sectors.

What I claim is:

1. A non-symmetrical multipolar system for the distribution of electrical energy, said system comprising a plurality of not more than three groups of star connected three phase windings, a terminal of one winding of each group remote from the common point of connection of its group being connected both to ground and to a terminal of a winding of another group remote from the common point of connection of said other group, the two windings so connected being out of phase by 360°/0.5$n$, where $n$ is the number of groups of star connected windings, distribution lines of the same section extending from terminals of said windings, and distribution lines of lesser section extending from neutral points and from said common point of connection, said system supplying three-phase voltages between distribution lines from any single group of windings and the distribution line from the common point of connection, and supplying a higher non-symmetrical multipolar voltage, this latter being the effective transport voltage.

2. A non-symmetrical multipolar system for the distribution of electrical energy, said system comprising a plurality of not more than three groups of star connected three phase windings, a terminal of one winding of each group remote from the common point of connection of its group being connected both to ground and to a terminal of a winding of another group remote from the common point of connection of said other group, the two windings so connected being out of phase by 360°/0.5$n$, where $n$ is the number of groups of star connected windings, distribution lines of the same section extending from terminals of said windings and a distribution line of lesser section extending from said common point of connection, said system supplying three-phase voltages between distribution lines from any single group of windings and the distribution line from the common point of connection and supplying a higher non-symmetrical multipolar voltage, this latter being the effective transport voltage.

3. A non-symmetrical multipolar system for the distribution of electrical energy, said system comprising a plurality of not more than three groups of star connected three phase windings, a terminal of one winding of each group remote from the common point of connection of its group being connected to a terminal of a winding of another group remote from the common point of connection of said other group, the two windings so connected being out of phase by 360°/0.5$n$, where $n$ is the number of groups of star connected windings, distribution lines of the same section extending from terminals of said windings and a distribution line of lesser section extending from said common point of connection, said system supplying three-phase voltages between distribution lines from any single group of windings and the distribution line from the common point of connection and supplying a higher non-symmetrical multipolar voltage, this latter being the effective transport voltage.

4. A system as set forth in claim 3 wherein distribution lines of lesser section extend from the common points of connection of the groups.

5. A system as set forth in claim 3 wherein $n$ equals two.

6. A system as set forth in claim 3 wherein $n$ equals two and wherein distribution lines of lesser section extend from the common points of connection of the groups.

7. A system as set forth in claim 3 wherein $n$ equals two and wherein the connected terminals of the two groups are connected to ground.

8. A system as set forth in claim 3 wherein $n$ equals two and wherein the connected terminals of the two groups are connected to ground and wherein distribution lines of lesser section extend from the common points of connection of the groups.

9. A system as set forth in claim 3 wherein $n$ equals three.

10. A system as set forth in claim 3 wherein $n$ equals three and wherein distribution lines of lesser section extend from the common points of connection of the groups.

11. A system as set forth in claim 3 wherein $n$ equals three and wherein the connected terminals of the groups are connected to ground.

12. A system as set forth in claim 3 wherein $n$ equals three and wherein the connected terminals of the groups are connected to ground and wherein distribution lines of lesser section extend from the common points of connection of the groups.

UGO CORBINO.

REFERENCES CITED

The following references are of record in the file of this patent:

UNITED STATES PATENTS

| Number | Name | Date |
| --- | --- | --- |
| 1,231,568 | Clark | July 3, 1917 |
| 1,266,066 | Fisher | May 14, 1918 |
| 1,691,447 | Schiesser | Nov. 13, 1928 |
| 1,794,945 | Cole et al. | Mar. 3, 1931 |
| 1,932,272 | Kaar | Oct. 24, 1933 |

FOREIGN PATENTS

| Number | Country | Date |
| --- | --- | --- |
| 270,876 | Italy | Aug. 2, 1927 |